United States Patent Office 3,795,746
Patented Mar. 5, 1974

3,795,746
SWEETENING COMPOSITION
Richard W. Walton, Langhorne, Pa., assignor to E. R.
Squibb & Sons, Inc., Princeton, N.J.
No Drawing. Continuation-in-part of abandoned application Ser. No. 741,340, July 1, 1968. This application Aug. 27, 1971, Ser. No. 175,737
Int. Cl. A23l 1/26
U.S. Cl. 426—96                                  10 Claims

ABSTRACT OF THE DISCLOSURE

A sweetening composition is prepared by intermixing an agglomerated sweetening agent with a liquid solution or suspension of an artificial sweetening agent and drying the resulting mixture.

RELATED APPLICATION

This application is a continuation-in-part of my copending U.S. patent application Ser. No. 741,340 filed July 1, 1968 now abandoned.

This invention relates to a sweetening composition prepared by intermixing an agglomerated sweetening agent with a liquid solution or suspension of an artificial sweetening agent and drying the resulting mixture.

Prior to this invention it was known that partially synthetic sweetening agents could be prepared by intermixing a natural sweetening agent (e.g., a sugar such as sucrose and lactose) with an artificial sweetener (e.g., saccharin) and agglomerating the mixture. It was also known that such agents could be prepared by intermixing an agglomerate of a natural sweetening agent with an artificial sweetener in the dry state. This latter procedure, however, suffered the disadvantage that a non-segregating, uniform product was difficult to prepare and maintain. The uniform mixing of two dry products, one of which (the agglomerate) is highly friable, is extremely difficult since to assure equal distribution rather drastic mixing methods are necessary which tend to disintegrate the agglomerate and thereby render the entire mixture unsatisfactory. Moreover, even if such a substantially uniform product is obtained, it tends to separate on standing so that when shipped in individual containers, the product is no longer uniform throughout the depth of the container.

It has now been found that these disadvantages can be obviated by preparing the sweetening composition in accordance with the process of this invention, and when so prepared, a product is obtained that is superior to that obtainable by the known processes in the art. In essence the process of this invention comprises agglomerating a natural sweetening agent and adding to the agglomerate, either after it has been fully dried or preferably after it has been at most only partially dried, a liquid solution or suspension of an artificial sweetening agent. The resulting mixture is then dried substantially immediately to give a stable, uniform mixture of an agglomerated natural sweetening agent having uniformly affixed thereto an artificial sweetening agent. The composition is resistant to separation of the artificial sweetening agent from the agglomerated natural sweetening agent on standing or when subjected to normal vibration.

Among the natural sweetening agents can be mentioned those sugars having a sweetness, such as lactose, dextrose, corn syrup solids and particularly sucrose, and mixtures thereof.

Among the artificial sweetening agents can be mentioned saccharins, such as sodium saccharin and magnesium saccharin, dipeptides, e.g. a dipeptide of the formula

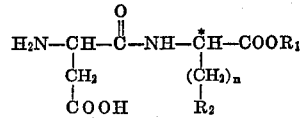

wherein the carbon marked with an asterisk is of the L-configuration, $n$ is an integer from 0 to 5, $R_1$ is an alkyl radical of up to 6 carbon atoms, an alkyl-aryl or alicyclic radical of up to 10 carbon atoms, and $R_2$ is a mono- or diunsaturated alicyclic radical of up to 8 carbon atoms, or when $n$ is 0, a phenyl radical, or a dipeptide of the formula

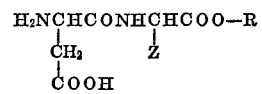

wherein Z is:

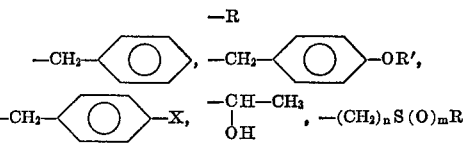

wherein R is an alkyl radical of up to 6 carbon atoms, or an alkyl-aryl or alicyclic radical of up to 10 carbon atoms, R' is hydrogen or an alkyl radical of up to 6 carbon atoms, $m$ is 0 or 2, $n$ is 1 or 2, and X is halogens, and mixtures thereof. The solutions and suspensions of the artificial sweetening agents are prepared by dissolving or suspending the artificial sweetening agent in a suitable liquid carrier, such as water or an organic solvent (e.g., a lower alkanol, such as methanol and ethanol) or an aqueous organic solvent. Preferably, however, the liquid carrier is water. The artificial sweetening agent can be present in any concentration in the liquid carrier, up to its limit of solubility at a tempertaure near its boiling point if a solution is desired. Preferably, however, if the liquid carrier is water, the artificial sweetener, if it is sodium saccharin, is present in a concentration of about 1 gram/gram to about 1.5 grams/grams, and optimally for continuous operation about 1.1 grams/gram to about 1.2 grams/gram, at a temperature of 70 to 80° C.

The natural sweetening agent is first agglomerated in the manner well known in the art, by use of such agglomerators as those disclosed in U.S. Pats. 2,893,871, 2,900,-256, 2,995,773 and 3,143,428. After the natural sweetening agent has been agglomerated, but preferably before it has been fully dried, the agglomerate is contacted with a spray of the liquid solution or suspension of the artificial sweetening agent. The amount of spray used depends on a number of factors, namely, the degree of agglomeration of the natural sweeting agent, the concentration of the artificial sweetening agent in the spray, the rate of passage of the agglomerate through the spray, the intrinsic sweetness of the natural sweetening agent and the artificial sweetening agent, and the desired sweetness of the product.

In general, the solution or suspension of artificial sweetening agent is sprayed at high pressure of from about 660 to about 900 p.s.i.g. from an orifice having a diameter of about 0.009 in. to about 0.011 in. Under these conditions the saccharin solution or suspension is mechanically atomized to substantially a molecular dispersion, that is to a particle size from about 10 to about 20 microns, typically to about 15 microns. At the same time that the saccharin solution or suspension is sprayed over the agglomerated natural sweetening agent, the latter is subjected to a hot air stream to remove any residual moisture from the agglomerate and to dry the artificial sweetening agent substantially immediately after it contacts the agglomerate. In this manner the artificial sweetening agent is adsorbed and absorbed onto and into the agglomerated sugar and becomes bonded thereto and does not separate from the agglomerated sweetening agent upon standing or storage, or when subjected to normal vibration.

Thus, if the natural sweetening agent is sucrose and the desired sweetness of the final product is that of sucrose and the sucrose is agglomerated so that its bulk density is halved, then sufficient artificial sweetener must be added to account for the loss of sweetness per unit volume due to the fact that only one-half as much sucrose is actually present as is in the corresponding volume of granulated sucrose. If sodium saccharin is used as the artificial sweetener, this means the addition of about 3 grams of saccharin per kilogram of sucrose, since sodium saccharin is more than three hundred times as sweet as sucrose.

After the agglomerate has been sprayed with the artificial sweetener, the mixture is dried immediately to give the final product. As the spraying is done before the agglomerate has been fully dried, the final drying step not only remove the solvent used in forming the suspension or solution of artificial sweetener but also removes any residual water present from the agglomeration step.

By the practice of this invention, therefore, there is obtained a substantially dry product that is a stable, intimate, uniform mixture of an agglomerated natural sweetening agent and an artificial sweetener affixed thereto in molecular dispersion. The product is uniform in composition and unlike previously known products cannot separate on standing. The preferred product contains agglomerated sucrose having a density of from about 18 pounds/cubic foot to about 30 pounds/cubic foot (optimally about 20 pounds/cubic foot to about 23 pounds/cubic foot), admixed with sodium saccharin in the weight proportion of about 20 grams to about 40 grams (optimally about 27 grams to about 33 grams) of sodium saccharin per kilogram of sucrose. Such a product has a sweetness equal to about one to 1.2 times that of sucrose.

The following examples illustrate the invention:

EXAMPLE 1

Finely powdered sucrose is fed into an agglomerator of the type described in U.S. Pat. 2,995,773. The sucrose is contacted with hot wet air and the agglomerates are formed and carried on a vibrating bed to the second area in which hot dry air sets the agglomerate and removes the moisture. The agglomerates formed in this manner have a density from about 19.0 to about 22.0 lbs. per cubic foot. The sucrose is supplied at a rate of about 3,200 kilograms per hour. 1.2 parts of sodium saccharin is dissolved in 1 part of very hot water in a mixing tank. The solution is pumped at a pressure of about 900 p.s.i.g. to a spray gun and through a full flat fan nozzle having a diameter of 0.011 in. to cover the moving bed of agglomerate from the second area. At the same time a secondary hot air stream is introduced from under the agglomerate bed to remove the water introduced and to lock the sodium saccharin into the agglomerate. The solution is continuously sprayed at a rate of about 13.55 liters per hour to add about 9.55 kilograms of sodium saccharin to about 3,200 kilograms of the agglomerate. The normal agglomerator fines recycling system requires five minutes to reach equilibrium prior to discharging a uniform product.

EXAMPLE 2

The procedure of Example 1 is followed except that a solution of 1.95 parts of water, 26.00 parts of methanol and 7.00 parts of sodium saccharin is used instead of the aqueous sodium saccharin solution. The solution is continuously sprayed at a rate of 51.7 liters per hour to add 9.55 kilograms of sodium saccharin to 3,200 kilograms of the agglomerate.

EXAMPLE 3

The agglomerated sucrose obtained by following the procedure of Example 1 but without adding the aqueous sodium solution is conveyed by a device having a vibrating screw feeder into the top side inlet of a verticle chamber. As the agglomerate falls by gravity a solution of 1.2 parts of sodium saccharin in 1 part of very hot water is pumped at high pressure to a spray gun and out a full flat fan nozzle to cover the falling stream of agglomerate. Hot air is forced into the bottom of the chamber and flows upward past the agglomerate to dry out the water.

EXAMPLE 4

The procedure of Example 1 is repeated except that the saccharin solution is pumped at a pressure of about 660 p.s.i.g. and the nozzle has a diameter of 0.009 in. The solution is continuously sprayed at a rate of about 7.72 l. per hour to add about 5.44 kg. of sodium saccharin to about 1800 kg. of agglomerate.

What is claimed is:

1. A process for preparing a sweetening composition which comprises spraying an agglomerated sugar with a liquid solution or suspension of an artificial sweetening agent, the spraying being carried out under conditions which produce a particle size of artificial sweetening agent of from about 10 to about 20 microns, while subjecting the agglomerated sugar to a drying medium thereby removing any residual moisture from the agglomerate and drying the artificial sweetening agent substantially immediately after it contacts the agglomerated sugar, whereby the artificial sweetening agent is adsorbed and absorbed onto and into the agglomerated sugar and becomes bonded thereto.

2. The process of claim 1 wherein the sugar is sucrose.

3. The process of claim 1 wherein the artificial sweetening agent is a saccharin.

4. A process according to claim 1 wherein a solution of the artificial sweetener is sprayed on the agglomerated natural sweetening agent.

5. A process according to claim 1 wherein a suspension of the artificial sweetener is sprayed on the agglomerated natural sweetening agent.

6. A process according to claim 1 wherein the artificial sweetening agent is sprayed at a pressure of from about 660 p.s.i.g. to about 900 p.s.i.g. from an orifice having a diameter of from about 0.009 inch to about 0.011 inch.

7. A stable, uniform sweetening composition comprising an agglomerated natural sweetening agent having adsorbed and absorbed thereon an artificial sweetener, the artificial sweetener having a particle size of from about 10 to about 20 microns.

8. The composition of claim 7 wherein the natural sweetening agent is sugar.

9. The composition of claim 8 wherein the sugar is sucrose.

10. The composition of claim 9 wherein the artificial sweetener is sodium saccharin.

References Cited

FOREIGN PATENTS

| 703,960 | 1965 | Canada | 99—141 A |
|---|---|---|---|
| 977,482 | 1965 | Great Britain | 99—141 A |

RAYMOND N. JONES, Primary Examiner.

U.S. Cl. X.R.

426—147, 305, 380